: 3,462,471
CYANOFORMIMIDE THIOESTERS
Wilhelm Gruber, Darmstadt, and Peter Quis, Gross-Zimmern, Germany, assignors to Rohm & Haas G.m.b.H., Darmstadt, Germany
No Drawing. Filed Mar. 22, 1966, Ser. No. 536,279
Claims priority, application Germany, Apr. 3, 1965, R 40,308
Int. Cl. C07c 123/00, 154/00, 155/00
U.S. Cl. 260—453     11 Claims

ABSTRACT OF THE DISCLOSURE

Cyanoformimide thioesters useful as contact, ingestive and respiratory insecticides of the formula $$NC-\underset{NH}{\overset{\parallel}{C}}-SRX$$

in which R is alkylene or alkenylene of 1 to 8 carbon atoms, or carbocyclic arylene or aralkylene containing one or two rings, X is hydrogen, halogen, hydroxy, $-OR_1$, $-COOH$, $-COOR_1$, $-CONH_2$, $-CONHR_1$,

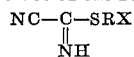

$-SR_1$, $R_1$ and $R_2$ being alkyl of 1 to 8 carbon atoms and together being alkylene to form a mononuclear heterocyclic ring with the nitrogen atom.

---

This invention relates to novel cyanoformimide thio esters and to a process for preparing them.

It is known, as described by H. M. Woodburn and C. E. Sroog in the Journal of Organic Chemistry, vol. 17 (1952), pages 371–378, that cyanogen introduced into a reaction mixture containing a mercaptan and an amine or alkali metal alcoholate catalyst will combine with the mercaptan to form an oxalic acid di-imide di-thio ester of the formula $$RS-\underset{NH}{\overset{\parallel}{C}}-\underset{NH}{\overset{\parallel}{C}}-SR$$

We have made the surprising discovery that, by the retrospectively simple expedient of either constantly providing an excess of cyanogen for reaction with a mercaptan, or utilizing a different type of catalyst, it is possible to obtain an entirely different, novel and useful product, i.e., a cyanoformimide thio ester of the formula $$NC-\underset{NH}{\overset{\parallel}{C}}-SRX$$

in which R is alkylene, alkenylene, arylene or aralkylene; X is hydrogen, halogen, hydroxy, $-OR_1$, $-COOH$ or $-COOR_1$, $-CONR_1$

$R_1$ being alkyl of 1 to 8 carbon atoms and RX further represents

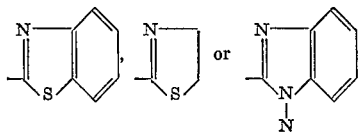

Mercaptans that are particularly suitable as starting materials in the method of this invention include methyl, ethyl, propyl, butyl, octyl, allyl, phenyl, benzyl, β-methoxy-ethyl, β-hydroxyethyl and β-dimethyl-aminoethyl mercaptans, thioglycollic acid, the alkyl esters and amides thereof, p-chlorothiophenol and α-mercapto benzthiazol.

The thio esters of this invention are obtainable by reacting the starting materials, a mercaptan and cyanogen, at a temperature between about −30° C. and about +150° C., preferably within the range of −5° C. to room temperature, in the presence of a catalytic amount of (A) a primary, secondary or tertiary aliphatic or aromatic amine or quaternary ammonium salt having 1 to 30 carbon atoms, or an alkali- or alkaline-earth compound, or (B) a compound of magnesium, aluminum or a heavy metal.

When the reaction is carried out with one or more of the Group A catalysts, it is necessary to maintain a constant excess of cyanogen in the reaction medium, e.g., by introducing the mercaptan into cyanogen or a cyanogen-containing reaction medium to avoid formation of an oxalic acid di-imide dithio ester. When, however, the reaction is carried out with one or more of the Group B catalysts, this precaution is unnecessary.

While we do not wish to be bound by any theory of operation expressed herein, it is believed that mercaptide ions are the active participants in the catalytic mechanism and that therefore any mercaptide, or compound capable of forming a mercaptide, is suitable as a catalyst. The difference between the activities of amines, alkali metal mercaptides and alkaline earth metal mercaptides, on the one hand, and of magnesium, aluminum and heavy metal mercaptides, on the other hand, when there is an excess of mercaptan rather than of cyanogen is believed to be due to a difference in basicity, the stronger bases, such as the amines, quaternary ammonium salts and alkali metal and alkaline earth metal mercaptides being strong enough to form oxalic acid di-imide dithio esters whereas the weaker bases, such as the mercaptides of magnesium, aluminum and heavy metals are capable of adding only one molecule of mercaptan to a molecule of cyanogen regardless of the molar ratio of mercaptide to cyanogen that is present.

Suitable Group A catalysts include such primary, secondary and tertiary amines and quaternary ammonium salts as butylamines, decylamines, diethylamine, aniline, hexamethylene diamines, triethylamine, tributylamines, piperidine, pyridine and tetramethyl ammonium hydroxide, as well as such alkali metal and alkaline earth metal compounds as the oxides, hydroxides, lower alkyl alcoholates, sulfides, alkylmercaptides, cyanides, carbonates and tertiary phosphates of lithium, sodium, potassium, calcium and barium, and the salts thereof with saturated or unsaturated, organic mono-, di-, tricarboxylic acids and halogen-substituted carboxylic acids having 1 to 8 carbon atoms. In Group B, suitable catalysts include, by way of example, the sulfates, sulfides, alkylmercaptides, halides, cyanides, cyanates, oxides, hydroxides, lower alkyl alcoholates, carbonates and phosphates of magnesium, aluminum and heavy metals, as well as the salts thereof with mono-, di-, tricarboxylic acids, halogen-substituted carboxylic acids having 1 to 8 carbon atoms, and complex compounds of said metals. The term "heavy metals" refers to metals, as defined in H. Römpp, "Chemie-Lexicon," 5th edition (1962), having a density in excess of 5 g./cc., e.g., silver, bismuth, cadmium, cobalt, chromium, copper, mercury, manganese, molybdenum, nickel, iron, lead, titanium, vanadium, tungsten, zinc and zirconium.

The amount of catalyst employed may vary widely, e.g., between about 0.01 and about 10 mol percent, preferably of the order to about 5 mol percent based on the amount of mercaptan reactant.

The reaction may be carried out in the liquid or vapor phase. When it is carried out in the liquid phase, the cyanformimide thio ester reaction product itself may be utilized as a solvent or reaction medium for the reactants. All organic solvents that are inert to the reactants and the catalyst, e.g., lower alkyl ethers and esters, low molecular weight chlorinated hydrocarbons, and aliphatic and aromatic hydrocarbons which have good solubility for cyanogen and at least some solubility for the mercaptan reactant are suitable. The catalyst may be soluble or insoluble in the solvent. If the reaction product is not capable of distillation, however, it is advantageous to use a catalyst that is insoluble in the reaction medium to facilitate direct obtention of an impurity-free reaction product upon filtration and removal of the solvent. If the reaction is carried out in the vapor phase, e.g., by reacting a vapor form of a mercaptan upon contact with a solid catalyst in an atmosphere of cyanogen, a solvent is unnecessary.

The process can be carried out, when a Group A catalyst requiring an excess of cyanogen is employed, by introducing the mercaptan gradually into a reaction medium of dissolved cyanogen, or cyanogen vapor, containing the catalyst. To promote maximum economy and conversion of both reactants, the reactants are used in substantially equimolar amounts. It is also possible to introduce equimolar amounts of the two reactants into a cyanogen-containing reaction medium. In any event, the possibility of a local molar excess of mercaptan should be avoided by intensive stirring or other agitation.

When a Group B catalyst is used, it makes no difference whether one reactant or the other is temporarily present in excess. Therefore, they can be added in any desired sequence or together. A simple and effective mode of operation is that of introducing cyanogen gas into a liquid mercaptan or a solution thereof containing a Group B catalyst.

The thioesters of this invention are useful as intermediates, e.g., in the preparation of the corresponding cyanoformic thioesters and, because of their toxicity, as contact, ingestive and respiratory insecticides for insects of all kinds, e.g., in the form of a 0.5% solution in mineral oil or a 0.5% emulsion in water for spray-eradication of mosquito larvae. The emulsions can, if necessary, be stabilized by use of known emulsifying agents.

The versatility and effectiveness of the method of this invention and the diversity of the thio esters obtainable thereby will become further apparent from the following examples.

EXAMPLES 1–9

26 to 30 grams (0.5 to 0.55 mol.) cyanogen are dissolved at −5 to 0° C. in 200 grams solvent, whereupon 5 mol. per cent of a Group A catalyst are added. 0.5 mol of a mercaptan are introduced at −5 to 0° C. while stirring vigorously. The reaction mixture is warmed to room temperature and stirred for an additional two hours.

The catalyst is then neutralized with glacial acetic acid, the solvent is drawn off and the remainder is subjected to vacuum distillation. The cyanoformimide thioesters obtained as the main fraction are oils of obnoxious odor.

The identities of the mercaptain, solvent and catalyst, and the yields of thioester, are tabulated below:

TABLE I

| Example | Mercaptan | Catalyst | Solvent | Yield of cyanoformimide thioester Grams | Yield of cyanoformimide thioester Percent Th. | Boiling point, 0° C. at (mm. Hg) | $n_D^{20}$ |
|---|---|---|---|---|---|---|---|
| 1 | Methylmercaptan | Triethylamine | Diethyl ether | [1] 30.5 | 61 | 49–51 (0.8) | 1.5250 |
| 2 | Ethylmercaptan | Diethylamine | do | [2] 56 | 95 | 51–52 (2.5) | 1.5084 |
| 3 | n-Propylmercaptan | Triethylamine | do | [3] 53 | 83 | 70–72 (2.8) | 1.5020 |
| 4 | Isopropylmercaptan | do | do | 49.4 | 77 | 89 (5) | 1.4914 |
| 5 | n-Butylmercaptan | Diethylamine | Methylenechloride | [4] 65.6 | 92 | 75–76 (4) | 1.4960 |
| 6 | Ethylmercaptan | Pyridine | Diethyl ether | 25.5 | 45 | 51–52 (2.5) | 1.5084 |
| 7 | do | Diethylamine | Tetrahydrofuran | 49.5 | 87 | 51–52 (2.5) | 1.5084 |
| 8 | Butylmercaptan | do | Ethyl acetate | 58.5 | 82 | 75–76 (4) | 1.4960 |
| 9 | do | do | Benzene | 54 | 76 | | 1.4962 |

[1] Calculated: N 28.0%, S 32.0%; found: N 27.0%, S 31.9%.
[2] Calculated: C 42.1%, N 24.6%; found: C 42.3%, N 24.4%.
[3] Calculated: C 46.9, H 6.3, N 21.9%; found: C 47.4, H 6.4, N 20.8%.
[4] Calculated: N 19.7%, S 22.6%; found: N 19.2%, S 22.5%.

EXAMPLES 10–29

0.5 mol percent of a finely pulverized Group B catalyst are suspended in a solution of 26 to 35 grams (0.5 to 0.65 mol) cyanogen in 200 grams of solvent. At −5 to 0° C., 0.5 mol of mercaptan are added dropwise while stirring vigorously. The temperature is permitted to increase to 20° C., the reaction mixture is stirred for an additional 2 to 8 hours, the catalyst is filtered off, the solvent is driven off, and the remainder is subjected to vacuum distillation.

The identities of the mercaptan, solvent and the catalyst, and the yields of thioester, are tabulated below:

TABLE II

| Example | Mercaptan | Catalyst | Solvent | Yield of cyanoformimide thioester Grams | Yield of cyanoformimide thioester Percent Th. | Boiling point 0° C. at (mm. Hg) | $n_D^{20}$ |
|---|---|---|---|---|---|---|---|
| 10 | Propyl mercaptan | Cadmium-acetate-dihydrate | Diethyl ether | 57.8 | 90 | 70–72 (2.8) | 1.5020 |
| 11 | n-Butylmercaptan | do | do | 63.5 | 90 | 75–76 (4) | 1.4960 |
| 12 | n-Octylmercaptan | do | do | 53 | 64 | 128 (3) | 1.4837 |
| 13 | Allylmercaptan | do | do | 33 | 52 | 82–90 (1.5) | 1.5277 |
| 14 | Thiophenol | do | do [1] | [2] 78 | 98 | | |
| 15 | Benzylmercaptan | do | do [1] | [3] 80 | 91 | | |
| 16 | n-Butylmercaptan | Cadmium-butylmercaptide | do | 63 | 89 | | 1.4960 |
| 17 | Ethylmercaptan | Potassium-cyanide | do | 46.5 | 82 | | 1.5084 |
| 18 | do | Zinc chloride | do | 36.6 | 64 | | 1.5085 |
| 19 | n-Butylmercaptan | do | do | 40 | 56 | | 1.4960 |
| 20 | Ethylmercaptan | Zinc acetate-dihydrate | do | 12.7 | 22 | | 1.5085 |
| 21 | n-Butylmercaptan | Cobaltous acetate-tetrahydrate | do | 62.4 | 88 | | 1.4961 |
| 22 | do | Cupric acetate-hydrate | do | 50.2 | 71 | | 1.4961 |
| 23 | Ethylmercaptan | Sodium hydroxide | do | 55.3 | 97 | | 1.5083 |
| 24 | do | Sodium ethyl mercaptide | do | 45.4 | 80 | | 1.5084 |
| 25 | do | Calcium hydroxide | do | 26.0 | 46 | | 1.5083 |
| 26 | do | Barium-acetate-hydrate | do | 4.6 | 8 | | 1.5085 |
| 27 | do | Aluminum-hydroxide | do | 37 | 65 | | 1.5083 |
| 28 | Butylmercaptan | Cadmium-butyl-mercaptide | Ethyl acetate | [4] 56.5 | 80 | | 1.4961 |
| 29 | do | do | Methylene chloride | [5] 54.2 | 76 | | 1.4960 |

[1] The reaction mixture was stirred for an additional eight hours in a closed vessel.
[2] Crude product easily decomposable upon distillation. Crude analysis: N calc. 17.3%; found 16.8%.
[3] Crude product easily decomposable upon distillation. Crude analysis: N calc. 15.9%; found 15.6%.
[4] Analysis: N calc. 19.7%; found 18.7%.
[5] Analysis: N calc. 19.7%; found 18.6%.

EXAMPLES 30–39

A mercaptan was dissolved in 100 grams diethylether and treated with 5 mol percent, calculated on the amount of mercaptan, of catalyst. At a temperature of −10° C., cyanogen was introduced into the solution, the reaction mixture was stirred for several hours at 20° C., and then worked up as described in the previous examples to obtain the final thio ether by vacuum distillation.

The quantities and identities of mercaptan, the identity of the catalyst, the quantities of cyanogen and thio esters, and the yield of the latter based on amount of cyanogen are tabulated below:

TABLE III

| | Mercaptan RSH | | | Cyanogen | | | Yield of NC—C(=NH)—SR | | |
|---|---|---|---|---|---|---|---|---|---|
| | R | Grams | Mols | Grams | Mols | Catalyst | Grams | Percent theor. | $n_D^{20}$ |
| Example: | | | | | | | | | |
| 30 | $C_2H_5$ | 26.9 | 0.434 | 28.2 | 0.543 | Cadmium acetate dihydrate | [1] 30.2 | 49 | 1.5089 |
| 31 | $C_2H_5$ | 31.0 | 0.5 | 13.0 | 0.25 | ___do___ | [2] 8.9 | 31 | 1.5090 |
| 32 | $C_3H_7$ | 38.0 | 0.5 | 13.0 | 0.25 | ___do___ | [3] 20.4 | 64 | 1.5020 |
| 33 | $C_3H_7$ | 38.0 | 0.5 | 26.0 | 0.5 | ___do___ | [4] 40.2 | 63 | 1.5026 |
| 34 | $C_4H_9$ | 45 | 0.5 | 13.0 | 0.25 | ___do___ | 16.9 | 48 | |
| 35 | $C_2H_5$ | 31 | 0.5 | 26 | 0.5 | Zinc chloride | 15.9 | 28 | 1.5090 |
| 36 | $C_2H_5$ | 24 | 0.38 | 20 | 0.38 | Cupric acetate monohydrate | 17.3 | 40.0 | 1.5091 |
| 37 | $C_4H_9$ | 45 | 0.5 | 26 | 0.5 | Cobalt acetate tetrahydrate | 21.1 | 30 | 1.4962 |
| 38 | $C_4H_9$ | 45 | 0.5 | 26 | 0.5 | Cadmium butyl mercaptide | 33.7 | 47.5 | 1.4960 |
| 39 | $C_4H_9$ | 45 | 0.5 | 26 | 0.5 | Magnesium acetate | 17.2 | 24 | |

Analyses for nitrogen:
[1] Calculated: 24.6%; Found: 23.9%.
[2] Calculated: 24.6%; Found: 24.1%.
[3] Calculated: 21.9%; Found: 21.1%.
[4] Calculated: 21.9%; Found: 21.5%.

EXAMPLE 40

A mixture of 39 grams thioglycol and 1.95 grams triethylamine was added dropwise, at a temperature of −10° C., to a solution of 35 grams cyanogen in 200 ml. diethylether in the course of 15 minutes. A solution of cyanoformimide hydroxyethyl thioester was thus obtained.

EXAMPLE 41

A mixture of 27.6 grams thioglycolic acid and 1.38 grams of triethylamine was added dropwise, at a temperature of 5° C., to a solution of 16 grams cyanogen in diethylether in the course of 20 minutes.

The cyanoformimide-carboxymethyl-thioester thus obtained was found upon analysis to contain 18.5% nitrogen (calculated: 19.45%).

EXAMPLE 42

At a temperature of 0° C., 26 grams cyanogen are introduced, while stirring well, into a solution of 53 grams β-ethoxyethyl mercaptan and 6.7 grams cadmium acetate dihydrate in 200 ml. diethylether. After two hours of further stirring at room temperature, a solution of cyanoformimide-β-ethoxyethyl-thioester is obtained.

In a similar procedure, solutions of cyanoformimide-p-chlorophenyl-thioester and cyanoformimide-2-benzothiazole-thioester are obtainable by reaction of cyanogen with p-chlorophenylmercaptan and 2-mercapto-benzothiazole, respectively.

We claim:
1. Thioester of the formula

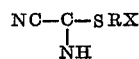

in which R is alkylene or alkenylene of 1 to 8 carbon atoms, or carbocyclic arylene or aralkylene containing one or two rings and X is hydrogen, halogen, hydroxy, —OR₁, —COOH or —COOR₁, R₁ being alkyl of 1 to 8 carbon atoms.

2. Compound as defined in claim 1 wherein RX is alkyl of 1 to 8 carbon atoms.

3. Compound as defined in claim 1 wherein RX is allyl.

4. Compound as defined in claim 1 wherein RX is phenyl.

5. Compound as defined in claim 1 wherein RX is benzyl.

6. Compound as defined in claim 1 wherein RX is β-hydroxyethyl.

7. Compound as defined in claim 1 wherein RX is carboxymethyl.

8. Compound as defined in claim 1 wherein RX is β-ethoxyethyl.

9. Compound as defined in claim 1 wherein RX is chlorophenyl.

10. A process for preparing a cyanoformimide thioester as defined in claim 1 which comprises reacting a mercaptan with a molar excess of cyanogen in the presence of a catalytic amount of a primary, secondary, or tertiary aliphatic amine, an aromatic amine, a quaternary ammonium salt having 1 to 30 carbon atoms, or an alkali metal or alkaline earth metal compound.

11. A process for preparing a cyanoformimide thioester as defined in claim 1 which comprises reacting a mercaptan with cyanogen in the presence of a catalytic amount of a compound of magnesium, aluminum or of a heavy metal.

References Cited

Woodburn et al., J. Organic Chem., vol. 17, p. 371–3 (1952).

ALEX MAZEL, Primary Examiner

BERNARD I. DENTZ, Assistant Examiner

U.S. Cl. X.R.

260—239, 293.4, 302, 306, 309.2, 326.82, 465; 424—244, 267, 270, 273

UNITED STATES PATENT OFFICE
CERTIFICATE OF CORRECTION

Patent No. 3,462,471                        August 19, 1969

Wilhelm Gruber et al.

It is certified that error appears in the above identified patent and that said Letters Patent are hereby corrected as shown below:

In the heading to the printed specification, line 8, after "R 40,308" insert -- ; Feb. 2, 1966, R 42,539 --.

Signed and sealed this 2nd day of June 1970.

(SEAL)
Attest:

Edward M. Fletcher, Jr.              WILLIAM E. SCHUYLER, JR.
Attesting Officer                       Commissioner of Patents